(12) United States Patent
Theiss

(10) Patent No.: US 6,808,786 B2
(45) Date of Patent: Oct. 26, 2004

(54) AUTOMOTIVE TUFTED CARPET WITH ENHANCED ACOUSTICAL PROPERTIES

(75) Inventor: Klaus Theiss, Durham, NC (US)

(73) Assignee: Freudenberg Nonwovens, Durham, NC (US)

(*) Notice: Subject to any disclaimer, the term of this patent is extended or adjusted under 35 U.S.C. 154(b) by 0 days.

(21) Appl. No.: 10/357,727

(22) Filed: Feb. 4, 2003

(65) Prior Publication Data
US 2004/0151870 A1 Aug. 5, 2004

(51) Int. Cl.[7] ................................................ B32B 33/00
(52) U.S. Cl. ....................................................... 428/95
(58) Field of Search .................................... 428/95, 96

(56) References Cited

U.S. PATENT DOCUMENTS

| | | | | |
|---|---|---|---|---|
| 2,713,012 A | * | 7/1955 | Hartstein | 428/93 |
| 4,140,071 A | * | 2/1979 | Gee et al. | 112/475.23 |
| 4,242,394 A | * | 12/1980 | Leib et al. | 428/95 |
| 4,426,415 A | * | 1/1984 | Avery | 428/17 |
| 4,439,476 A | * | 3/1984 | Guild | 428/96 |
| 4,705,706 A | * | 11/1987 | Avery | 428/17 |
| 5,962,101 A | | 10/1999 | Irwin, Sr. et al. | |
| 6,207,599 B1 | * | 3/2001 | Coolen et al. | 442/242 |
| 6,280,818 B1 | * | 8/2001 | Smith et al. | 428/95 |
| 6,475,592 B1 | * | 11/2002 | Irwin | 428/95 |
| 6,479,125 B1 | * | 11/2002 | Irwin, Sr. | 428/95 |
| 2002/0172795 A1 | * | 11/2002 | Gardner et al. | 428/85 |
| 2003/0104749 A1 | * | 6/2003 | Emirze et al. | 442/361 |

FOREIGN PATENT DOCUMENTS

| | | | | |
|---|---|---|---|---|
| EP | 821748 A1 | * | 2/1998 | A47G/27/02 |
| WO | WO 01/64991 A2 | | 9/2001 | |

* cited by examiner

Primary Examiner—Cheryl A Juska
(74) Attorney, Agent, or Firm—Jenkins, Wilson & Taylor, P.A.

(57) ABSTRACT

An automotive tufted carpet with improved acoustic properties is formed with a two-part primary backing. The first backing layer is formed of a woven or non-woven material, and the second backing layer is formed of a microfilament spunlaced material possessing sound absorbing acoustic properties. The first backing layer and second backing layer are thermobonded together with an adhesive web positioned therebetween to form the two-part primary backing. Tufts of yarn are then sewn through the two-part primary backing. The resulting acoustically enhanced automotive tufted carpet may be backcoated or precoated, and may have a secondary backing adhered thereto as a matter of choice.

37 Claims, 2 Drawing Sheets

AUTOMOTIVE TUFTED CARPET WITH ENHANCED ACOUSTICAL PROPERTIES

FIELD OF THE INVENTION

The present invention relates generally to carpets, and more particularly to automotive tufted carpet having a double primary backing for providing necessary physical properties including moldability while also providing enhanced acoustical performance.

RELATED ART

In the past, tufted carpeting for automobiles was made by tufting yarn into a backing of woven jute or the like. The jute backing was heavy and relatively stable, so one coated the back with latex or other adhesives only to lock in the tufts and the carpet was ready to installed. More recently, however, lightweight materials such as woven polypropylene tape and polyester spunbonds have been used as the primary backing through which yarn is tufted and a secondary backing of a stable material is adhered to the back of the carpet by an adhesive. Presently, popular primary backings are polypropylene and polyester formed from either woven or non-woven or spunbond materials. Such backings are preferred due to their light weight and performance. Typically, after face yarns are tufted into the primary backing, the resulting carpet is back coated with an adhesive to lock in the stitches.

Another example of a conventional tufted carpet for automotive end use would provide a layer of LUTRADUR® spunbonded polyester (available from Freudenberg Nonwovens NA) that is tufted with face yarns that are typically nylon (polyamide) or the like. Next, a polyethylene pre-coat followed by a polyethylene coating is applied in a manner well known to those skilled in the art to manufacture an automotive tufted carpet. This type of carpet construction, however, does not provide much in the way of noise dampening or acoustical properties that would serve to minimize external and internal noise in an automobile. Previously, efforts have been made to provide a noise dampening automotive tufted carpet by tufting face yarns into a primary backing of LUTRADUR® spunbonded polyester and then pre-coating the tufted carpet with a suitable pre-coat such as polyethylene. Next, a layer of EVA Mass Back with a preferred weight of about 30 to 80 ounces/yard$^2$ is adhered to the tufted carpet in order to provide a noise dampening layer to the automotive tufted carpet. The resulting automotive tufted carpet is acoustically superior to previously known automotive tufted carpet but is relatively heavy and still leaves much to be desired in acoustical performance characteristics.

Although not intended to address acoustical shortcomings of automotive tufted carpet, the prior art does include some rugs or carpets having a plurality of primary backings. For example, U.S. Pat. No. 2,713,012 to Hartstein discloses a tufted rug having dual primary backings of cotton and jute or the like. The Hartstein patent does not contemplate back coating of the rug, and relies on the double backing to assist in holding in the tufts. Also, the jute backing is heavy enough to stabilize the carpet. U.S. Pat. No. 4,426,415 to Avery discloses a carpet in the nature of artificial turf having a plurality of primary backings, the backings varying in fineness from bottom to top of the carpet. All of the plurality of backings are the same material, and polypropylene is specifically mentioned. Since Avery contemplates back coating of the carpet, the problem of stretching and distorting will be present, though perhaps somewhat slightly reduced due to the greater strength of multiple backings. U.S. Pat. No. 4,705,706 to Avery discloses a multiple primary backing, but the backing may be NYLON® or the like while the face yarn is polypropylene so the back stitch can be set by heat rather than by a separately applied adhesive.

Finally, U.S. Pat. No. 5,962,101 to Irwin, Sr. et al provides a tufted carpet having a double primary backing wherein one layer of the backing is a conventional backing of polypropylene or the like and the other layer is an open weave material having greater strength and less stretch than conventional backing. The face yarns are tufted through both parts of the double backing which secures the two backings together. An adhesive coating is applied over the back of the tufted carpet, and the double primary backing provides a dimensionally stable carpet during the adhesive coating process and without the application of a secondary backing. However, the carpet may by choice have conventional woven or non-woven sheet materials adhered thereto as a secondary backing. Irwin, Sr. et al. specifically discloses that the upper layer of the two-layer backing will be a conventional woven or non-woven backing material such as polypropylene. The lower layer of the two-layer primary backing is an open weave material that may comprise a leno weave having mono-filaments or tape yarn in the warp direction and a spun/fiber in the filling direction. For maximum stability, the lower layer will be formed of fiberglass or the like. None of the two layer primary backing prior art known to applicant addresses the objective of the present invention to provide an automotive tufted carpet having enhanced acoustical properties.

Also prior art of interest, applicant notes German Patent No. 100 09 281 to Emirze et al. (and assigned to the parent company of the assignee of the present invention) which discloses a new sound-absorbent material and process for making the material which comprises a micro-filament non-woven with a weight of about 40 to 300 grams/meter$^2$. Preferably, the sound-absorbent material is one in which the non-woven consists of melt-spun, aerodynamically stretched multi-component endless filaments woven directly into a fleece with a titer of 1.5 to 3 dtex, and wherein the multi-component endless filaments are split and bonded to an extent of at least 80% into micro-endless filaments with a titer of 0.1 to 0.3 dtex. The sound-absorbent material is one in which the multi-component endless filaments comprise (1) a cross section with an orange-like multi-segment structure (pie) where the segments alternately contain one of the two incompatible polymers or comprise (2) a side-by-side (ss) configuration of the incompatible polymers in the multi-component endless filaments. The process of the invention provides for manufacturing the sound-absorbent material comprising multi-component endless filaments being spun from the melt, stretched and then woven directly into a fleece, followed by pre-bonding, after which the non-woven is fully bonded by high-pressure fluid jets and simultaneously split into micro-endless filaments with a titer of 0.1 to 1.2 dtex. Emirze et al. discloses that the sound-absorbent material is suitable for many end uses including tuft backing for automotive tufted carpet since it possesses at least equally good sound-absorbent properties as conventional automobile carpets while using significantly less material since heavy carpet backings can be dispensed with. Other uses of the sound-absorbent material include headliner construction, pillar, floor and trunk trims, dashboard construction, engine compartment and/or floor trim, and the like. The sound-absorbent material disclosed in the patent is manufactured and sold by Freudenberg KG under the trade name EVOLON®.

Emirze et al. does not disclose use of the sound-absorbent material as one layer of a double-layer or two-part primary backing for an automotive tufted carpet such as provided for by the present invention in order to provide a combination of the required physical properties for conventional automotive tufted carpets and the enhanced acoustical properties of the novel automotive tufted carpet of the invention. Emirze et al. merely discloses use of the sound-absorbent material for a number of uses including as the primary backing for automotive tufted carpet.

It will therefore be seen that the prior art in both automotive tufted carpets and sound absorbent materials has not provided a solution to the problem of providing an automotive tufted carpet that possesses the required moldability of conventional automotive tufted carpet while also providing enhanced acoustical properties that are greatly desirable in the manufacture of modern automobiles. Thus, applicant has discovered a novel construction for an automotive tufted carpet that provides unexpected and surprising enhancements in acoustical properties that are much to be desired in the manufacture of modern automotive tufted carpets.

SUMMARY OF THE INVENTION

The present invention provides an automotive tufted carpet having improved acoustic properties and comprising a two-layer primary backing including a first backing formed of a woven or non-woven or spunbond material; a second backing formed of a micro-filament spunlaced materials; and an adhesive web between the first backing and the second backing serving to facilitate thermobonding the first backing and second backing together. A plurality of tufts of yarn are sewn through the two-layer primary backing.

The present invention also includes a method for making the automotive tufted carpet comprising bringing together a first backing formed of a woven or non-woven or spunbond material; a second backing formed of a micro-filament spunlaced material; and an adhesive web positioned between the first backing and the second backing. Heat is applied during processing to the adhesive web such that the adhesive web acts to thermobond the first backing and second backing together to form a primary backing composite. Finally, the first backing and second backing are fed through a tufting machine and tufts of yarn sewn through both of the first backing and second backing to provide face yarns on one of the first and second backings.

The automotive tufted carpet possesses the requisite strength and moldability of conventional automotive tufted carpet while also being provided with surprising and unexpectedly superior acoustical properties so as to assist in minimizing the noise level in an automobile.

BRIEF DESCRIPTION OF THE DRAWINGS

Some of the objects of the invention having been stated hereinabove, other objects will become evident as the description proceeds when taken in connection with the accompany drawings as best described hereinbelow.

DETAILED DESCRIPTION OF THE INVENTION

Figure 1:
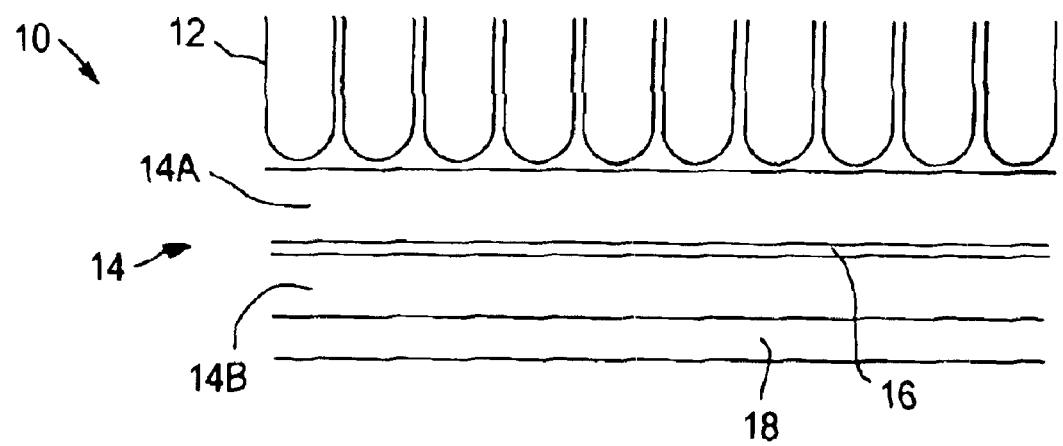
FIG. 1 is an enlarged vertical cross section view showing the construction of an automotive tufted carpet made in accordance with the present invention.
Figure 2:
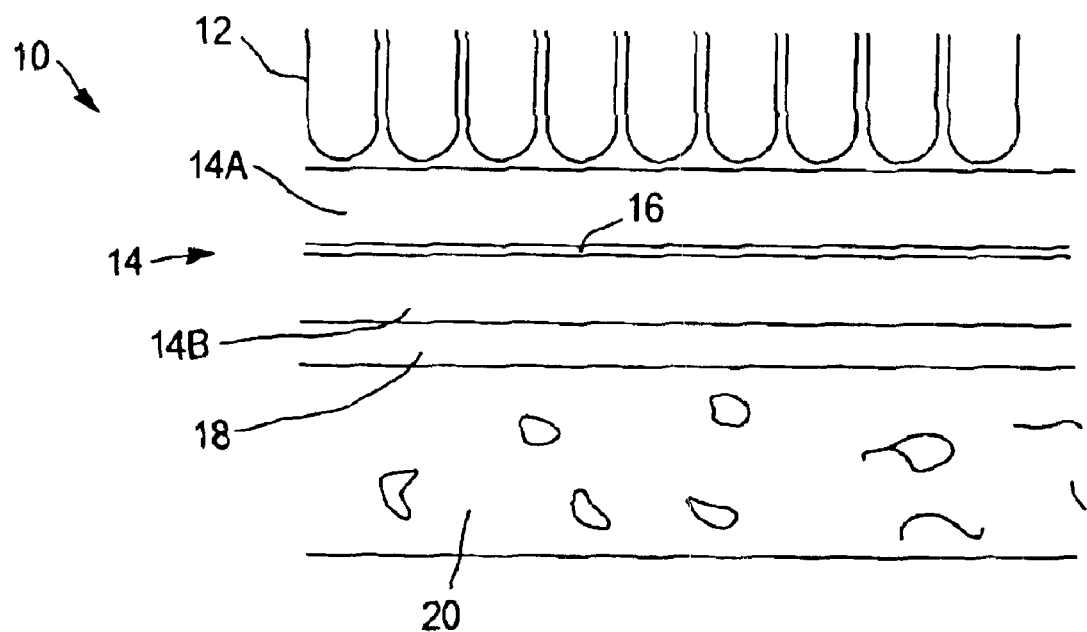
FIG. 2 is a view similar to FIG. 1 but showing an optional secondary backing provided over the precoat of the primary backing of the tufted carpet.

Referring now more particularly to FIGS. 1 and 2 of the drawings, and to those embodiments of the invention here presented by way of illustration, FIG. 1 shows a piece of automotive carpet generally designated 10. The carpet 10 comprises face yarns 12 and a primary backing generally designated 14. The primary backing comprises an upper or first backing 14A and a lower or second backing 14B. The term "upper backing" as used herein indicates the backing at the face of the carpet and the term "lower backing" indicates the backing on the bottom of the carpet when the carpet is laid.

The upper backing 14A is a conventional woven, non-woven or spunbond material formed most suitably from polypropylene (PP), polyethylene terephthalate/polyprothylene (PET/PP), polyethylene terephthalate/polyacrylic (PET/PA) and polyethylene terephthalate (PET) polymers. The lower backing 14B is a micro-filament spunlaced material most suitably formed from PET/PA (pie cross section) polymer. A layer of a suitable adhesive web 16 is provided between first backing 14A and second backing 14B in order to allow the two-layers of primary backing 14 to be thermobonded together without losing their air permeability prior to manufacture of the tufted carpet at a temperature between about 70 and 140° C. It is contemplated that the suitable adhesive web 16 is preferably an adhesive non-woven web, although the adhesive web may also include film or liquid webs. Tufts 12 of pile yarn are stitched or sewn through both first backing 14A and second backing 14B of primary backing 14 which serves to hold tufts 12 together. Carpet 10 may then be partly or fully backed with styrene butadiene rubber (SBR) or natural latex, polyethylene, ethylene vinyl acetate and or combinations depending on the specific market segment within the automotive carpet market wherein the product will be used (e.g., moldable floor carpets, trunk cargo or throw-in tufted mats). The backing or pre-coating is designated 18 in the drawings. Finally, carpet 10 may, optionally, be laminated to a non-woven or spunbond secondary backing 20 for aesthetic or functional reasons dictated by the end use (see FIG. 2).

First backing 14A of primary backing 14 is most suitably a layer of 100% PET LUTRADUR® Style 52 manufactured specifically for tufted automotive carpets by Freudenburg Nonwovens NA. First backing 14A should weigh between about 80 to 140 grams/meter$^2$. Second backing 14B is most suitably a layer of EVOLON® micro-filament spunlaced product developed and available from Freudenburg KG although other similar fiber products could be used. Second backing 14B formed of the micro-filament spunlaced material should weigh between about 50–300 grams/meter$^2$, and most suitably 100–120 grams/meter$^2$, with a titer of 0.1–0.3 dtex and a side-by-side (ss) PET/PA 6.6 or Pie-Bico continuous filament-based system with acoustical properties. Adhesive web 16 most suitably comprises a low density polyethylene with a melting point range between about 103 to 112° C., and is preferably an adhesive web (Style No. POX80519G) available from Spunfab weighing about 0.45 oz/yard$^2$, although other adhesive webs could be used and are contemplated as being within the scope of the present invention.

Although many different types of tufted carpet 12 may be used in the manufacture of automotive tufted carpet 10 including PP, PET and nylon (polyamide), a preferred tufted carpet is nylon (polyamide).

In the above discussion, it should be understood and appreciated that first backing 14A may be used as either the top layer or bottom layer of primary backing 14, and that second backing 14B may be used as either the top layer or bottom layer of primary backing 14 depending upon whether it is desired to have the micro-filament spunlaced material layer 14B on the top of bottom surface of primary backing 14.

Also, those skilled in the automotive tufted carpet art will understand that even with the mechanical lock for tufts 12 that have been stitched through both first backing 14A and second backing 14B of primary backing 14, it is desirable to back-coat the carpet to ensure that tufts 12 will not pull out. As noted hereinabove, the pre-coat or back coating 18 may be a partial or full coating of material selected from the group comprising SBR or natural latex, polyethylene, ethylene vinyl acetate and mixtures thereof. Finally, as shown in FIG. 2, secondary backing 20 may be adhered to carpet 10 shown in FIG. 1 as matter of manufacturing choice or to accommodate certain end uses.

It will be appreciated that primary backing 14 indicates a sheet material through which yarns 12 are inserted and secondary backing 20 indicates a sheet of material that is fixed to the back of tufted carpet 10 and that does not have yarns 12 inserted therethrough. Yarns 12 are inserted only through the two-layers, 14A and 14B, of primary backing 14. The secondary backing as noted hereinbefore is optional and will not be required for many uses and applications of carpet 10, and the secondary backing 20 can be formed of many materials including Mass Back foams, and PUR-foam and the like.

The invention will be understood better upon consideration of the following example:

EXAMPLE 1

A PB (primary backing) composite was manufactured on a flat belt laminator with a 4 meter heating zone followed by a pair of calendar rolls and a 1 meter long cooling section. It was determined that the best condition for operating was at a speed of 10 meters/minute, a calendar roll pressure of 70 p.s.i. and a top/bottom temperature of 325° F. (160° C.). Following the aforementioned process for forming the primary backing, the backing was tufted with NYLON® fiber having a denier of 1400 by a COBBLE tufting machine operating at a speed of 850 r.p.m.

The primary backing comprises a 67 inch wide first backing of LUTRADUR® Style 52 from Freudenberg Nonwoven NA plus a second backing of EVOLON® Type 011 (100 grams/meter$^2$) from Freudenberg KG. An adhesive web, Style POX80519G from Spunfab, was used as the adhesive web between the first backing and second backing to thermobond the backings together during the manufacture of the primary backing. The tufted carpet was pre-coated or back-coated with PE at a weight of 400 grams/meter$^2$.

Figure 3:
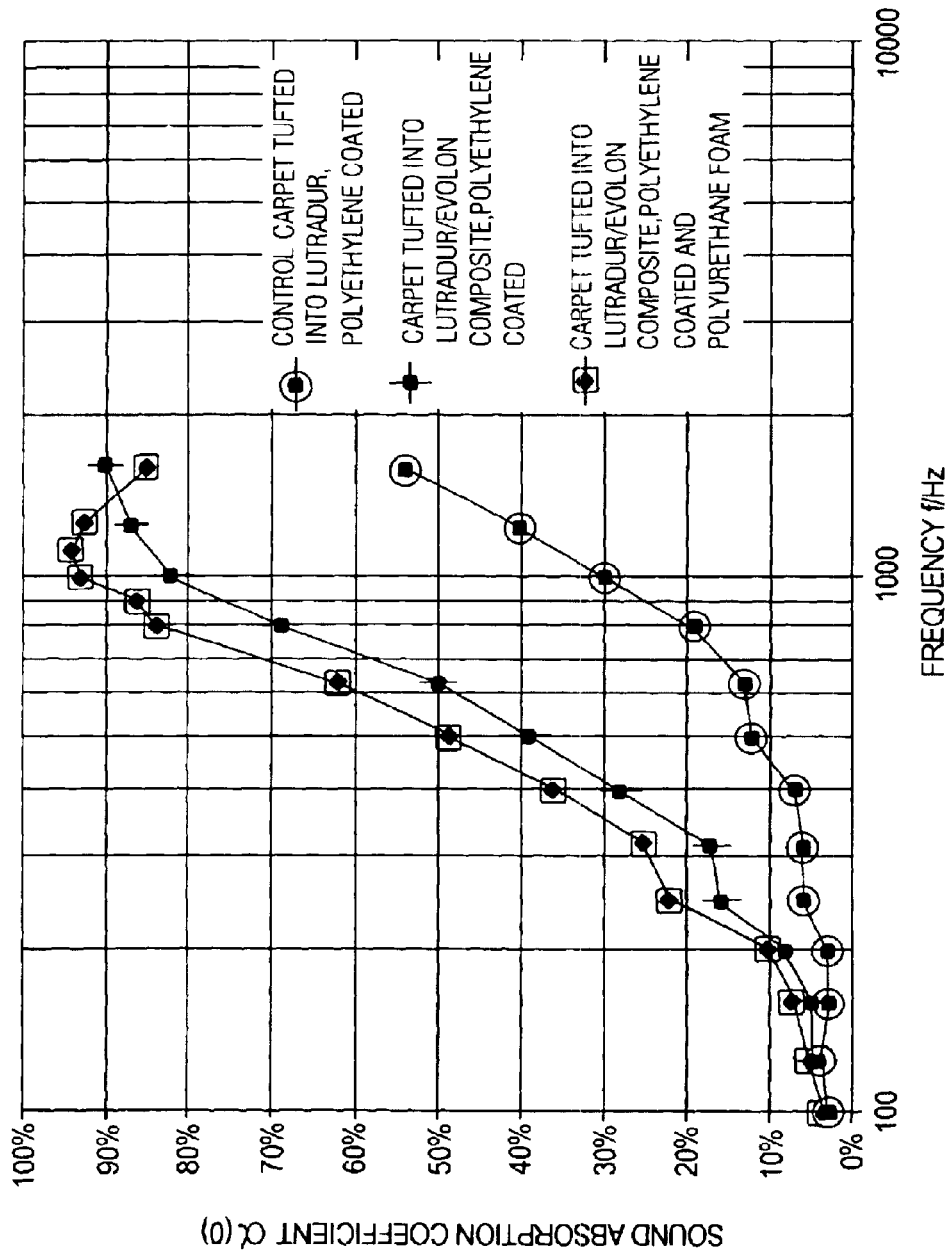
FIG. 3 is a chart showing the acoustic performance of two embodiments of a tufted carpet made in accordance with the present invention compared to a conventional tufted carpet.

The acoustic properties of the test sample compared to a conventional automotive tufted carpet formed from nylon (polyamide) yarn with a LUTRADUR® primary backing are shown in the chart designated as FIG. 3. As can be seen, the test sample possesses a higher sound absorption coefficient throughout the frequency test range (both with polyethylene coating and polyethylene coating with polyurethane foam.)

From the foregoing it will be appreciated that the present invention provides an automotive tufted carpet 10 that possesses the necessary dimensional stability and moldability required in this market as well as superior acoustics in contrast to automotive tufted carpets presently known. Automotive tufted carpet 10 possesses unexpected and surprising sound absorbing performance due to use of EVOLON® micro-filament spunlaced material (or similar fiber spunlaced material) as a second backing in primary backing 14 in combination with a first backing in primary backing 14 of conventional LUTRADUR® spunbond nonwoven material (or similar spunbond nonwoven material) so that the carpet can be tufted through both layers of primary backing 14 which have been thermobonded together by a suitable adhesive web as described hereinbefore. The unexpected and surprising result is a relatively lightweight automotive tufted carpet that possesses the necessary tensile strength, tear strength, and elongation required to achieve a molded carpet in addition to the unexpected and surprising enhancement in sound absorbing performance.

It will be understood by those skilled in the art that the particular embodiments of the invention here presented are by way of illustration only and are meant to be in no way restrictive; therefore, numerous changes and modifications may be made, and the full use of equivalence resorted to, without departing from the spirit or scope of the invention as set forth in the appended claims.

What is claimed is:

1. An automotive tufted carpet having improved acoustic properties and comprising:
   (a) a two layer backing including:
      (i) a first backing formed of a woven or non-woven material;
      (ii) a second backing formed of a micro-filament spunlaced material; and
      (iii) an adhesive nonwoven web positioned between said first backing and said second backing and thermobonding said first backing and said second backing together; and
   (b) a plurality of tufts of yarn sewn through said two layer backing.

2. The tufted carpet according to claim 1 wherein said woven or non-woven material is formed from a material selected from the group consisting of: PP, PET/PP, PET/PA, and PET polymers and mixtures thereof.

3. The tufted carpet according to claim 2 wherein said woven or non-woven material comprises spunbond PET.

4. The tufted carpet according to claim 3 wherein said spunbond PET weighs between 80 to 140 grams/meter$^2$.

5. The tufted carpet according to claim 1 wherein said micro-filament spunlaced material is formed from PET/PA polymer.

6. The tufted carpet according to claim 5 wherein said micro-filament spunlaced material weighs between 50–300 grams/meter$^2$ with a titer of 0.1–0.3 dtex and is formed from a side-by-side or pie-shaped PET/PA 6.6 bicomponent filament.

7. The tufted carpet according to claim 1 wherein said adhesive nonwoven web comprises a low density polyethylene material with a melting point range between about 103–112° C.

8. The tufted carpet according to claim 1 wherein said plurality of tufts are formed from material selected from the group consisting of: PP, PET and polyamide.

9. The tufted carpet according to claim 8 wherein said plurality of tufts comprises polyamide.

10. The tufted carpet according to claim 1 including a back coating on the opposing side of said two layer backing from said yarn tufts.

11. The tufted carpet according to claim 10 wherein said back coating is material selected from the group consisting of SBR or natural latex, polyethylene, ethylene vinyl acetate and mixtures thereof.

12. The tufted carpet according to claim 10 wherein a secondary backing is adhered to said back coating.

13. The tufted carpet according to claim 1 wherein said first backing serves as the top layer of said two layer backing.

14. The tufted carpet according to claim 1 wherein said second backing serves as the top layer of said two layer backing.

15. An automotive tufted carpet having improved acoustic properties and comprising:
   (a) a two layer backing including:
      (i) a first backing formed of spunbond PET weighing between 80–140 grams/meter$^2$;
      (ii) a second backing of a spunlaced material formed from PET/PA micro-filaments weighing between 50–300 grams/meter$^2$; and
      (iii) a low density polyethylene adhesive nonwoven web positioned between said first backing and said second backing and thermobonding said first backing and said second backing together; and
   (b) a plurality of tufts of yarn sewn through said two layer backing.

16. The tufted carpet according to claim 15 wherein said micro-filament spunlaced material comprises a titer of 0.1–0.3 dtex and is formed from a side-by-side or pie-shaped PET/PA 6.6 bicomponent filament.

17. The tufted carpet according to claim 15 wherein said adhesive nonwoven web comprises a melting point range between about 103–112° C.

18. The tufted carpet according to claim 15 wherein said plurality of tufts are formed from material selected from the group consisting of PP, PET and polyamide.

19. The tufted carpet according to claim 18 wherein said plurality of tufts comprises polyamide.

20. The tufted carpet according to claim 15 including a back coating on the opposing side of said two layer backing from said yarn tufts.

21. The tufted carpet according to claim 20 wherein said back coating is material selected from the group consisting of SBR or natural latex, polyethylene, ethylene vinyl acetate and mixtures thereof.

22. The tufted carpet according to claim 20 wherein a secondary backing is adhered to said back coating.

23. The tufted carpet according to claim 15 wherein said first backing serves as the top layer of said two layer backing.

24. The tufted carpet according to claim 15 wherein said second backing serves as the top layer of said two layer backing.

25. A method for making an automotive tufted carpet with enhanced acoustical properties, said tufted carpet comprising a two layer backing having tufts of yarn sewn therein, said method comprising the steps of:
   (a) bringing together a first backing formed of a woven or non-woven material, a second backing formed of a micro-filament spunlaced material, and an adhesive nonwoven web positioned between said first backing and said second backing;
   (b) applying suitable heat to said first backing, second backing and adhesive nonwoven web such that said adhesive nonwoven web acts to thermobond said first backing and said second backing; and
   (c) feeding said first backing and said second backing through a tufting machine and sewing said tufts of yarn through both said layers to provide face yarns on one of said first and second backings.

26. The method according to claim 25 wherein said woven or non-woven material is formed from a material selected from the group consisting of: PP, PET/PP, PET/PA and PET polymers and mixtures thereof.

27. The method according to claim 26 wherein said woven or non-woven material comprises spunbond PET.

28. The method according to claim 27 wherein said spunbond PET weights between 80 to 140 grams/meter$^2$.

29. The method according to claim 25 wherein said micro-filament spunlaced material is formed from PET/PA polymer.

30. The method according to claim 29 wherein said micro-filament spunlaced material weighs between 50–300 grams/meter$^2$ with a titer of 0.1–0.3 and is formed from a side-by-side or pie-shaped PET/PA 6.6 bicomponent filament.

31. The method according to claim 25 wherein said adhesive nonwoven web comprises a low density polyethylene material with a melting range between about 103–112° C.

32. The method according 25 including applying heat according to step (b) at a temperature of between about 70 and 140° C.

33. The method according to claim 25 including applying a back coating on said two layer backing on the opposing side from said face yarns.

34. The method according to claim 33 wherein said back coating is material selected from the group consisting of SBR or natural latex, polyethylene, ethylene vinyl acetate and mixtures thereof.

35. The method according to claim 33 including adhering a secondary backing to said coating.

36. The method according to claim 25 including forming said two layer backing with said first backing as the top layer and said second backing as the bottom layer.

37. The method according to claim 25 including forming said two layer backing with said second layer as the top layer and said first backing as the bottom layer.

\* \* \* \* \*

UNITED STATES PATENT AND TRADEMARK OFFICE
CERTIFICATE OF CORRECTION

PATENT NO. : 6,808,786 B2
DATED : October 26, 2004
INVENTOR(S) : Klaus Theiss

It is certified that error appears in the above-identified patent and that said Letters Patent is hereby corrected as shown below:

<u>Title page,</u>
Item [73], Assignee, replace "Freudenberg Nonwovens, Durham, NC (US)" with
-- Freudenberg Spunweb Company, Durham, NC (US) --.

Signed and Sealed this

Twenty-third Day of August, 2005

JON W. DUDAS
*Director of the United States Patent and Trademark Office*